United States Patent [19]
Belrose

[11] Patent Number: 5,281,042
[45] Date of Patent: Jan. 25, 1994

[54] SADDLE CLAMP ASSEMBLY

[75] Inventor: Charles R. Belrose, Huntsville, Ala.

[73] Assignee: The United States of America as represented by the Administrator of the National Aeronautics and Space Adminstration, Washington, D.C.

[21] Appl. No.: 977,468

[22] Filed: Nov. 17, 1992

[51] Int. Cl.$^5$ .............................................. F16L 3/10
[52] U.S. Cl. ..................... 403/234; 403/21; 403/12; 248/74.4
[58] Field of Search ............... 403/234, 233, 235, 237, 403/261, 398, 199, 12, 21; 248/74.1, 74.4

[56] References Cited

U.S. PATENT DOCUMENTS

| | | | |
|---|---|---|---|
| 558,391 | 4/1896 | Israel | 248/74.4 |
| 3,128,073 | 4/1964 | Berlyn | 248/74.1 |
| 4,007,660 | 2/1977 | Smith et al. | 89/1.807 |
| 4,358,874 | 11/1982 | Kaiser | 403/12 |
| 4,368,937 | 1/1983 | Palombo et al. | 403/21 |
| 4,483,639 | 11/1984 | McCandless | 403/317 |
| 4,655,658 | 4/1987 | Gulistan | 411/353 |
| 4,723,053 | 2/1988 | Amaya | 403/21 |
| 4,858,860 | 8/1989 | Richards | 248/74.1 |
| 5,020,676 | 6/1991 | McFarland | 248/74.1 |

FOREIGN PATENT DOCUMENTS 3804940 1/1989 Fed. Rep. of Germany ..... 248/74.1

Primary Examiner—Paula A. Bradley
Assistant Examiner—Erik R. Puknys
Attorney, Agent, or Firm—Robert L. Broad, Jr.; Guy M. Miller; John R. Manning

[57] ABSTRACT

A saddle clamp assembly includes a hollow cylindrical body centered about a longitudinal axis and being diametrically split into semicircular top and bottom sections each having a pair of radially outwardly projecting connection flanges at their opposite ends. A pair of bolts are captively retained on the top section flanges and are threadable into nuts captively retained on the bottom section flanges. A base member is anchored to a central underside portion of the bottom clamp body section and has a pair of connection tabs positioned beneath the bottom clamp body section connection flanges on opposite sides of the clamp axis. A pair of bolts are captively retained on the base member connection tabs and are threadable into a pair of nuts captively retainable on a support structure. The connection tab and connection flanges on each side of the clamp body are axially offset in a manner permitting downward installation/removal tool access to the lower bolts past the connection flanges. An elongated retention tether is used to connect the top clamp body section to the balance of the clamp assembly to prevent loss of the top clamp body section when it is removed from the bottom clamp body section.

1 Claim, 2 Drawing Sheets

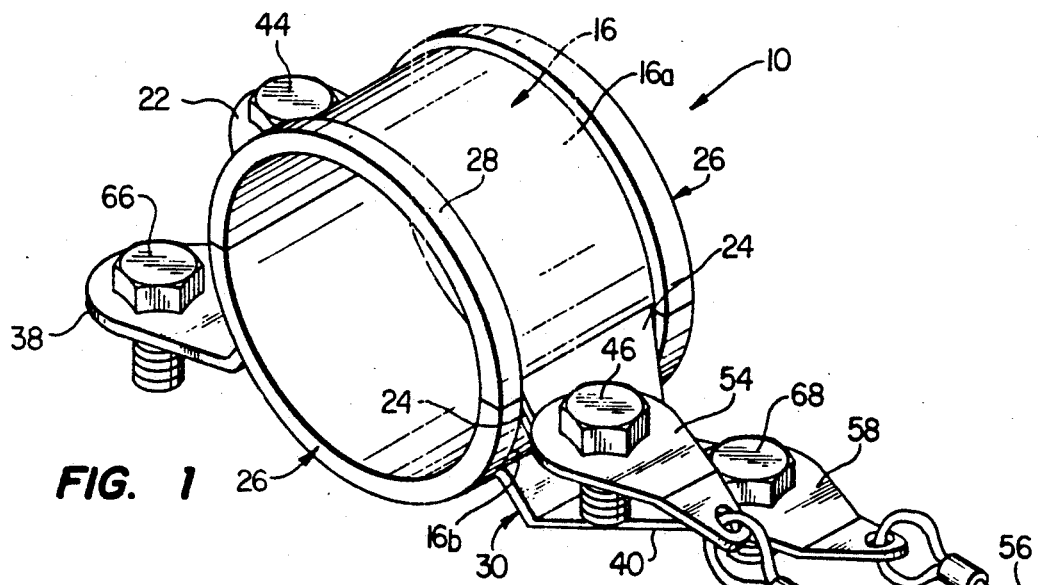
FIG. 1
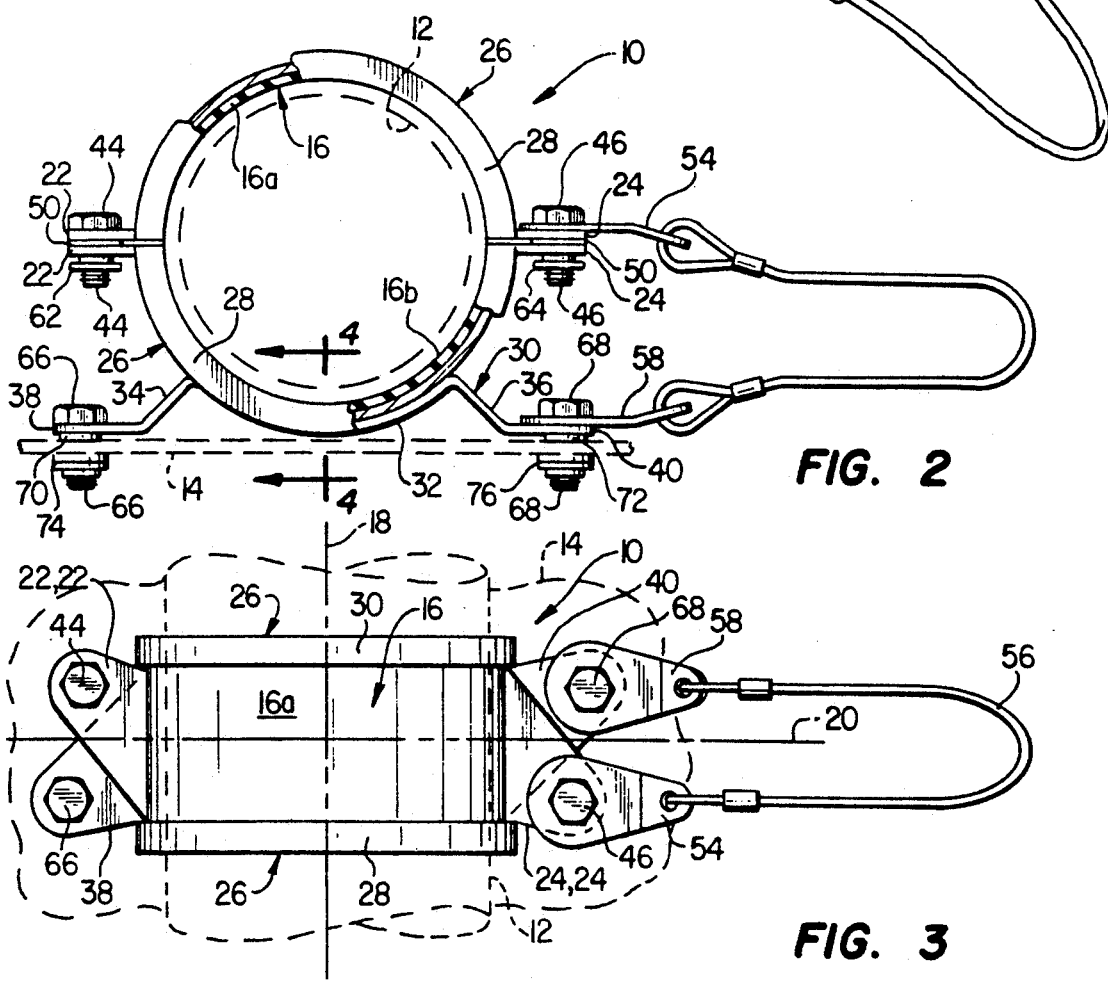
FIG. 2
FIG. 3

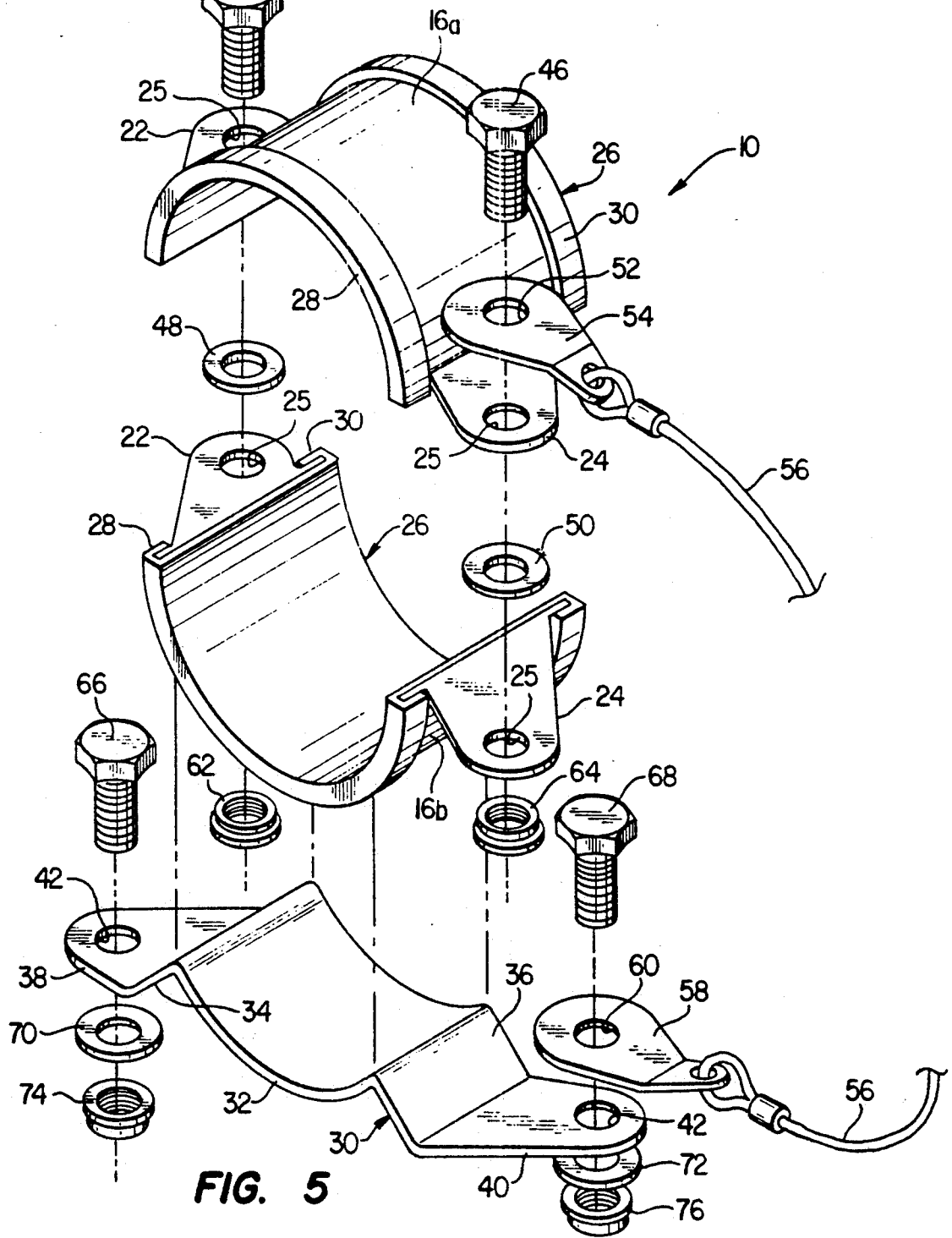

SADDLE CLAMP ASSEMBLY

ORIGIN OF THE INVENTION

The invention described herein was made in the performance to work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention.

The present invention generally relates to equipment support and mounting apparatus, and more particularly relates to saddle clamp structures used to secure elongated tubing runs, wire bundles and the like to a support surface.

2. Description of Related Art

Devices commonly referred to as saddle clamps are conventionally utilized to firmly but removably secure longitudinally spaced apart sections of tubing runs, wire bundles and other elongated objects to suitable support structures to prevent undesirable lateral deflection of the elongated object. In a conventional configuration thereof, a saddle clamp typically comprises an elongated, plate-like arcuate body portion having connection tabs extending outwardly from its opposite ends, lying generally in a common plane, and having mounting holes extending therethrough.

To removably secure a given section of the elongated object to, for example, a plate-like support structure, the object section is positioned between two spaced apart mounting holes formed in the support structure, the clamp body is placed over the object section in a manner aligning the connecting tab holes with the support structure holes, a pair of bolts are extended through the aligned pairs of connecting tab and support structure holes, and suitable washers and nuts are placed on the bolts to secure them in place.

While simple in construction and theoretically easy to use, conventionally configured saddle clamps of this general type are subject to a variety of well known problems, limitations and disadvantages. For example, particularly in congested or limited access areas they can be difficult to install and remove without dropping, and possibly losing, their separate nut, bolt and washer components.

Additionally, when these conventionally configured saddle clamps are used to hold spaced apart sections of tubing runs, realignment of the tubing run (once one or more of the clamps have been removed) can be difficult, if not impossible, since removal of the clamp body easily permits its previously secured tubing run section to laterally deflect. When the clamp is to be reattached, it is often very difficult to move the freed pipe run section back into place, realign the clamp body and support structure mounting holes, and then reinstall the bolts, washers and nuts.

It can be readily be seen from the foregoing that it would be desirable to provide an improved saddle clamp that eliminated, or at substantially reduced the foregoing problems, limitations and disadvantages typically associated with conventionally configured saddle clamps of the general type previously described herein. It is accordingly an object of the present invention to provide such an improved saddle clamp.

SUMMARY OF THE INVENTION

In carrying out principles of the present invention, in accordance with a preferred embodiment thereof, an improved saddle clamp assembly is provided for removably securing a longitudinal section of an elongated, generally circularly cross-sectioned object, such as a tubing run or a wire bundle, to a support structure. The saddle clamp assembly includes a hollow cylindrical clamp body centered about a longitudinal axis and configured to coaxially and clampingly receive the longitudinal section of the object.

The clamp body is split, along a diametrically extending plane, into separable, generally semicircular top and bottom clamp body sections each having connection flanges projecting radially outwardly from opposite ends thereof, the connection flanges of the top clamp body section being alignable with and releasably securable to the connection flanges of the bottom clamp body section on opposite sides of the clamp body. First fastening means are provided for releasably securing the connection flanges of the top clamp body section to the connection flanges of the bottom clamp body section.

The saddle clamp assembly also includes a base member anchored to a central underside portion of the bottom clamp body section, the base member having a pair of connection tabs positioned on opposite sides of the longitudinal clamp body axis, beneath the connection flanges of the bottom clamp body section, and releasably securable to the support structure. Second fastening means are provided for releasably securing the base member to the support structure.

According to a feature of the invention, the base member connection tabs are axially offset relative to the connection flanges of the bottom clamp body section in a manner permitting downward installation/removal tool access to the second fastening means past the connection flanges of the bottom clamp body section. This feature of the invention significantly facilitates the ease of installation and removal of the saddle clamp assembly in limited access areas.

According to another feature of the invention, the first fastening means comprise first and second cooperatively and releasably interengageable portions, the first portion of the first fastening means being captively retained on the connection flanges of the top clamp body section, and the second portion of the first fastening means being captively retained on the connection flanges of the bottom clamp body section. Additionally, the second fastening means comprise cooperatively and releasably interengageable first and second portions, the first portion of the second fastening means being captively retained on the base member connection tabs, and the second portion of the second fastening means being captively retainable on the support structure. This feature of the invention eliminates the presence of loose fastening members which can be separated from the clamp assembly and become lost.

According to a further feature of the invention the saddle clamp assembly is provided with elongated flexible retention means connected at one end thereof to the top clamp body section, and at the other end thereof to the balance of the saddle clamp assembly. When the top clamp body section is removed from the bottom clamp body section, these retention means maintain a physical connection between the top clamp body section and the balance of the saddle clamp assembly to prevent loss of the removed top clamp body section.

BRIEF DESCRIPTION OF THE DRAWINGS

FIG. 1 is a perspective view of an improved saddle clamp embodying principles of the present invention;

FIG. 2 is a partially cut away left end elevational view of the clamp illustrating, in phantom, a representative mounting structure to which the clamp is secured, and a representative length of tubing which the clamp operatively supports;

FIG. 3 is a top plan view of the clamp;

FIG. 4 is a partial cross-sectional view taken through the clamp along line 4—4 of FIG. 2; and FIG. 5 is an exploded perspective view of the clamp.

DETAILED DESCRIPTION

Referring now to FIGS. 1-5 of the drawings, the present invention provides a specially configured saddle clamp assembly 10 which is representatively utilized to firmly but removably secure a longitudinal section of an elongated, generally cylindrical object, such as the representatively illustrated tubing run 12 to a suitable support structure such as the support plate 14 as shown in FIGS. 2-4. The clamp assembly 10 may also be used to removably secure a longitudinal section of another elongated, generally circularly cross-sectioned object, such as a wire bundle, to the support structure if desired.

The saddle clamp assembly 10 includes a hollow cylindrical metal body portion 16 which is centered about a longitudinal axis 18 (FIG. 3) and has an elongated rectangular cross-section along its length as best illustrated in FIG. 4. For purposes of subsequent description and discussion, it will be assumed that a transverse centerline axis 20 (FIG. 3) perpendicularly intersects the axis 18, with the axes 18,20 lying in a reference plane that diametrically bisects the clamp body 16.

Body portion 16 is diametrically split, along the aforementioned reference plane, into essentially identical semicircular top and bottom sections 16a,16b each having radially outwardly projecting mounting flanges 22 and 24 positioned at their opposite ends and having circular mounting holes 25 (FIG. 5) formed therethrough. A pair of resilient cushioning pads 26 extend along the inner side surfaces of the arcuate top and bottom clamp body sections 16a,16b and are retained on their associated body section by means of opposite side edge channel portions 28,30 of the pad that receive corresponding opposite side edge portions of the body section as best illustrated in FIGS. 4 and 5.

The improved saddle clamp assembly of the present invention also includes an elongated base plate member 30 longitudinally extending generally parallel to axis 20 and having a concavely curved central longitudinal portion 32 welded to a longitudinally central underside portion of the bottom clamp body portion 16b as best illustrated in FIG. 2. The opposite ends of base plate portion 32 are connected to downwardly offset base plate portions 34,36 which are in turn respectively connected to outer end tab portions 38,40 having circular mounting holes 42 extending therethrough (FIG. 5). Tabs 38,40 lie in a plane positioned beneath and generally parallel to the plane in which the flanges 22,24 of the bottom clamp body section 16b lie.

For purposes later described, as viewed in FIG. 3 the outer end of the base plate tab 38 is downwardly offset relative to the transverse axis 20, and the outer end of the base plate tab 40 is upwardly offset relative to the axis 20. With the top and bottom clamp body sections 16a,16b releasably interconnected as subsequently described, the outer ends of the flanges 22 on the left side of the clamp body are upwardly offset relative to the axis 20, and the outer ends of the flanges 24 on the right side of the clamp body are downwardly offset relative to the axis 20.

Referring to FIGS. 1-4, first fastening means are provided for releasably interconnecting the aligned clamp flange pairs 22 and 24 to thereby operatively retain the clamp body 16 in place around the representative tubing run 12. These first fastening means include a pair of bolts 44,46 which are respectively extended downwardly through the holes 25 in the flanges 22,24 of the top clamp body section 16a. Bolts 44,46 are captively and rotatably retained on these flanges by retention washers 48,50 operatively mounted on the undersides of the top clamp body section flanges 22,24.

For purposes later described, the bolt 46 also passes downwardly through a circular opening 52 in an eyelet plate 54 which overlies the top clamp body section flange 24 and is connected to one end of an elongated flexible retention member representatively in the form of a lanyard or tether 56. The eyelet plate 54 is thus captively retained on the top clamp body section flange 24. The opposite end of the retention lanyard 56 is secured to an eyelet plate 58 having a circular opening 60 extending therethrough.

The first fastening means also include a pair of nuts 62,64 respectively and captively retained on the undersides of the bottom sides of the bottom clamp body section flanges 22 and 24, over their openings 25, and adapted to threadingly receive lower end portions of the bolts 44,46. The nuts 62,64 are preferably captive, self-clinching, self-locking nuts manufactured by Penn Engineering, Danboro, Pa., and are pressed into the lower clamp body section flange openings 25 from the bottom side and are swaged into place therein to prevent pullout.

The saddle clamp assembly 10 also includes second fastening means for removably securing the base plate 30 to the support plate 14. These second fastening means include a pair of bolts 66 and 68, a pair of retention washers 70 and 72, and a pair of floating, self-clinching, self-locking nuts 74 and 76 as manufactured by Penn Engineering. Nuts 74 and 76 are captively retained within suitable openings extending through the support plate 14. Bolt 66 extends downwardly through the hole 42 in base plate tab 38 and is captively and rotatably retained on tab 38 by the washer 70 which is disposed on the underside of tab 38. Bolt 68 sequentially extends downwardly through the opening 60 in the eyelet plate 58 and the hole 42 in the base plate tab 40, and is rotatably and captively retained on the tab 40 by the washer 72 which is disposed on the underside of tab 40.

The saddle clamp assembly 10 provides a key advantage over conventionally constructed saddle clamps in that all of the fastener members used in conjunction with the assembly 10 are captively retained on portions of the assembly (or on the support plate in the case of the nuts 74,76) so that none of such fastening members can be separated from the assembly and lost. To summarize, the bolts 44,46 and the washers 48,50 are captively retained on the top clamp, body section 16a; the nuts 62,64 are captively retained on the bottom clamp body section 16b; and the bolts 66,68 and the washers 70,72 are captively retained on the base plate 30.

Accordingly, the base plate 30 can be disconnected from the support plate 14, and the top clamp body section 16a can be disconnected from the bottom clamp body section 16b, without any of the fastening members falling off and becoming lost. Moreover, when the top clamp body section 16a is disconnected from the bottom clamp body section 16b, the retention tether conveniently retains the removed top clamp body section on the balance of the clamp assembly, thereby eliminating the possibility of misplacing or losing the removed section or having it drop to the floor when removed.

To use the clamp assembly 10 in securing a longitudinal section of the tubing run 12 to the support plate 14 as shown in FIGS. 2 and 3, the top clamp body section 16a is removed from the bottom clamp body section 16b by loosening the bolts 44 and 46. The base plate 30 is then secured to the support plate 14 by respectively tightening the bolts 66,68 into the nuts 74,76 captively retained on the support plate 14 as previously described. While this is being done, the removed top clamp body section 16a conveniently hangs near the balance of the clamp assembly on the tether 56.

A bottom side portion of the section of the tubing run 12 to be secured to the support plate 14 is then lowered into place within the bottom clamp body section 16b, the top clamp body section 16a is placed over the tubing run section with the flanges 22,24 of the top clamp body section 16a respectively overlying and aligned with the flanges 22,24 of the bottom clamp body section 16b, and the captively retained bolts 44,46 are respectively tightened into the captively retained nuts 62,64.

It should be noted that, according to another feature of the present invention, the relative offsets between the base plate tabs 38,40 and the clamp body flanges 22,24 positioned above them conveniently permit an installation or removal tool to be passed downwardly past the flanges 22,24 to reach the lower bolts 66,68 for purposes of attaching the base plate to the support plate or removing it therefrom. This is particularly advantageous in limited access situations in which little or no horizontal tool access space is available adjacent the clamp assembly.

Another advantage provided by the clamp assembly 10 is that the top clamp body section 16a may be removed from the balance of the installed assembly, for purposes of inspecting and maintaining the retained tubing run, without undesirably causing the tubing run to laterally deflect in a direction parallel to the axis 20. When the top clamp body section 16a is so removed, the remaining bottom clamp body section 16b conveniently restrains the tubing run against such undesirable lateral deflection at the clamp assembly.

The foregoing detailed description is to be clearly understood as being given by way of illustration and example only, the spirit and scope of the present invention being limited solely by the appended claims.

What is claimed is:

1. A saddle clamp for holding a cylindrical object, comprising a hollow, cylindrical clamp body configured to coaxially receive and hold said cylindrical object, said clamp body being split along a diametrically extending plane into semi-cylindrical top and bottom body portions, each of said body portions having a pair of connection flanges extending from opposite sides thereof to terminate in distal ends, said flanges lying in a plane radial to said body portion and each having therein a mounting hole at a location adjacent to the distal end of the flange, the flanges on the body portions being congruent to each other such that the mounting holes in the flanges on one body portion are in register with the mounting holes in the flanges on the other body portion, an elongated base plate secured to one of the body portions and having at opposite ends thereof a pair of connection tabs each having therein a mounting aperture, said connection tabs lying on opposite sides of the body portions and in a second plane generally parallel to said radial plane, the distal ends of said flanges on one side of the body portions being displaced axially in said radial plane in one direction and the distal ends of the flanges on the other side of the body portions being displaced axially in said radial plane in the opposite direction, said connection tabs being displaced axially in said second plane in opposite directions to each other, each of said connection tabs being displaced axially in a direction opposite to the direction that the flanges on the same side of the body portions are displaced.

* * * * *